Dec. 3, 1968    H. D. ROE    3,414,299
PIPE COUPLINGS
Filed Dec. 17, 1965
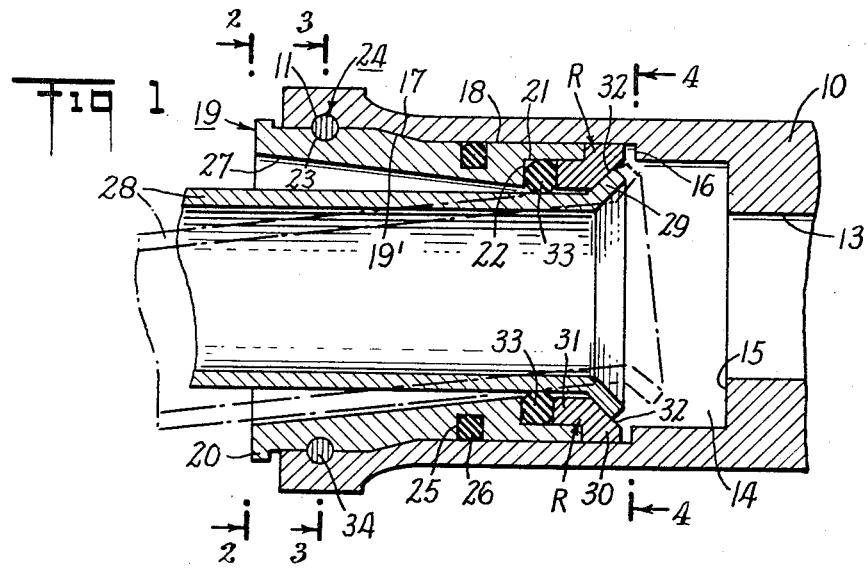
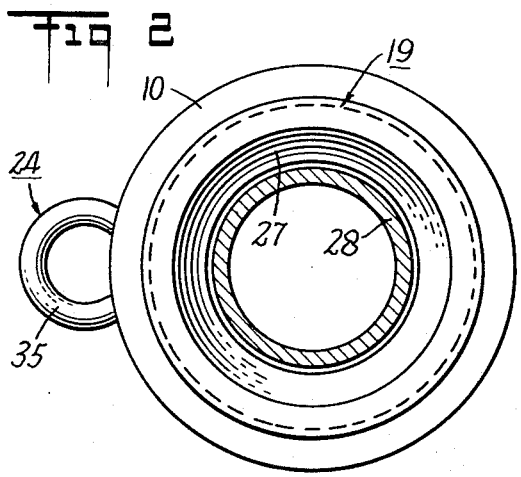
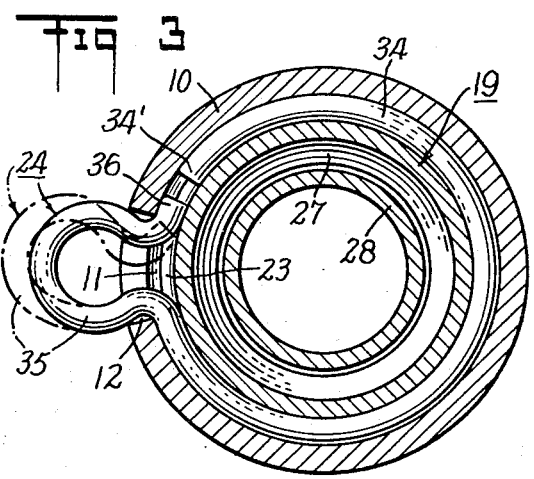
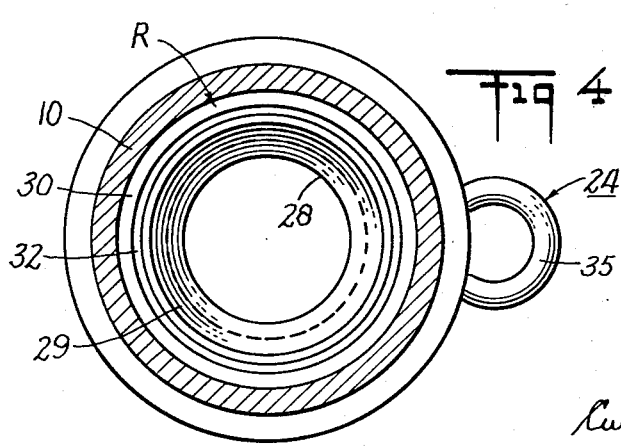
INVENTOR
*Homer D. Roe*
BY
*Curtis, Morris & Safford*
ATTORNEYS

United States Patent Office 3,414,299
Patented Dec. 3, 1968

3,414,299
PIPE COUPLINGS
Homer D. Roe, Huntington, N.Y.
(% Holmberg Inc., Melville, N.Y. 11746)
Filed Dec. 17, 1965, Ser. No. 514,643
3 Claims. (Cl. 285—234)

ABSTRACT OF THE DISCLOSURE

A flexible pipe coupling characterized by an outer casing, an intermediate sleeve and an inner tube, with the tube being flared at one end, the sleeve having a truncated longitudinal cross-section so that the tube is angularly movable with respect to the sleeve.

The present invention relates to a pipe coupling which in some respects may be viewed as involving certain improvements over the device disclosed in my U.S. Patent No. 3,127,199 dated Mar. 31, 1964.

It is noted in regard to said patented structure that although it allows torsional and limited axial displacement of tube 13, it permits no angular or rocking movement thereof in relation to sleeve 12 or body 10. In known forms of couplings where sealing rings are employed, there is difficulty in assembling the parts and incorporating them in existing pipe lines; and complexity of the devices interferes with ready removal and replacement of worn or impaired parts.

In order to overcome the shortcoming of the prior art structures, the present invention permits a coupling to be provided wherein a tube is angularly displaceable with respect to a sleeve and casing, yet, due to a unique sealing ring and bushing arrangement, still provides a good tight connection.

Accordingly, an object of the present invention has been to provide a flexible pipe coupling which will have the advantage in use of facilitating installations where there is need to carry a line of pipe around an obstruction, for example, or in various different directions. A further object has been to provide an effectively sealed connection which can be quickly assembled at least in part in the shop and if necessary entirely on the job and one which can readily be disassembled for repair or replacement of parts.

Other objects and distinctive features of the invention not above referred to will appear in the following description and claims and in the accompanying drawings wherein I have shown a preferred embodiment and have described the same in this specification. It is to be understood that these disclosures are not intended to be either exhaustive or limiting of the invention but are presented for the purpose of illustrating the same and so that others skilled in the art may so fully understand the invention, its principles and applications in use that they may embody it and adapt it to use in various forms appropriate to different requirements.

In the drawings:

FIG. 1 is a central longitudinal vertical section through a portion of a fitting which embodies the invention;

FIG. 2 an end elevation from the line 2—2 of FIG. 1;

FIG. 3 a transverse vertical section on the line 3—3 of FIG. 1; and

FIG. 4 a transverse vertical section on the line 4—4 of FIG. 1.

A fitting of preferred form for the purposes of this invention and as seen in FIG. 1, includes a hollow housing or casing 10 provided with an internal groove 11 and an opening 12, FIG. 3, into said groove 11. A passageway 13 provides communication between the interior or bore of the fitting and a pipe or other conduit, not shown. Said casing is advantageously formed with a cylindrical coaxial cavity 14 defined at its inner end by an annular shoulder 15. A cylindrical coaxial cavity 18 of greater diameter than 14 is defined at its inner end by an annular shoulder 16. The bore of casing 10 is of maximum diameter at its outer (left FIG. 1) end and includes a frustoconical internal surface zone 17 which tapers down to approximately the diameter of cavity 18.

Said bore of casing 10 is shaped and dimensioned to receive a sleeve 19 having a peripheral flange 20 at its outer end (left FIG. 1) and a frustoconical external surface zone 19' intermediate its ends and conforming in contour to taper zone 17 of the casing. At its inner end, sleeve 19 has a coaxial cylindrical cavity 21 defined at its outer side by a shoulder 22. An external groove 23 in said sleeve is arranged and adapted to register peripherally with internal groove 11 of the casing to accommodate a locking element 24 when the parts are assembled as seen in FIG. 1. An external groove 25 in sleeve 19 retains an appropriate sealing ring 26 for sealing contact with opposed portions of cavity 18 of the casing. The bore of sleeve 19 includes a portion 27 of frustoconical contour which narrows from maximum diameter at its outer end to minimum diameter at its inner end where it intersects shoulder 22.

A tube 28 which provides a conduit through the coupling, in effect, a continuation of the passageway 13, is flared at its inner end to provide an annular flange 29 angularly disposed in relation to the tube axis.

An annular retaining element or bushing indicated generally as R, FIG. 1, includes a peripheral annular flange 30, an outwardly directed annular flange 31 and an inwardly directed truncated conical face 32.

Procedure for assembling the coupling may vary depending on circumstances. In a typical case, where the inner end of tube 28 is pre-flared, assembly is conveniently effected by sliding bushing R along said tube 28 from its outer end to bring oblique face 32 thereof into contact with the similarly inclined outwardly directed face of flange 29. A suitable sealing ring, as 33, is moved along tube 28 to bear effectively against the periphery of said tube and against the outwardly directed annular face of flange 31. Another suitable sealing ring 26 is operatively positioned in groove 25 of sleeve 19 to bear effectively against inner surface portions of casing 10. The parts thus assembled while coaxially engaged with tube 28 are pushed into the bore of casing 10 through its open outer end to bring grooves 11 and 23 into register and to seat zone 19' of the sleeve snugly against zone 17 of the casing.

In an alternative procedure, as where tube 28 is of relatively melleable material and its inner end is not pre-flared, the seal ring 33 and bushing R may be coaxially engaged on said tube and the inner end thereof flared by employing a spinner or other suitable tool for that purpose.

Said locking element 24 is conveniently formed with a relatively elongated flexible portion 34, a resilient loop 35 and a terminal detent 36, FIG. 3. To lock the parts in operative assembled relation, flexible part 34 of element 24 is inserted into groove 11, 23 through hole 12 and advanced therein to bring its free end 34' approximately to the position shown in FIG. 3, i.e. short of opening 12. Resilient loop 35 is manually compressed and terminal detent 36 is inserted through hole 12 whereupon loop 35 is permitted to spring back to expanded locking condition with detent 36 extending into groove 11, 23 to a position opposite the free end of the flexible portion 34.

From the foregoing description, it is evident that sleeve 19, bushing R and tube 28 may be pre-assembled either with or without a casing 10; or they may be assembled on the job if that procedure is preferred either initially or as an incident of maintenance.

It is noted that, in use, repeated flexing of tube 28 in sleeve 19 may impair the effectiveness of seal 33 which must be replaced, preferably without actually removing tube 28 or reforming its flared end 29. This is feasible where the sealing ring 33 is made of a substance sufficiently flexible or elastic to permit removal and replacement by stretching the ring over said flared end 29 and the bushing R.

In cases where sealing or other parts become defective and require replacement, they are readily made accessible by pulling locking element 24 out of grooves 11, 23 and then drawing sleeve 19 outwardly from or part way through the larger end opening of casing 10.

In operation, with the parts assembled as seen in FIG. 1, sleeve 19 is securely held against outward displacement from and in operative sealed contact with interior surfaces of casing 10. Bushing R serves both to confine sealing ring 33 and to provide an effective bearing for the oblique face 32 of flange 29 thus in effect tending to retain tube 28 against outward displacement by internal pressure developed in the fitting.

It is noted that tube 28 is angularly movable in relation to sleeve 19 to an extent limited by bore 27 thereof; is movable endwise to a limited degree determined by the axial dimension of cavity 14; and may also be rotated on its own axis if need be. The flexibility here indicated is obtained without reducing effectiveness of the sealing rings during such movements or in any position of adjustment secured thereby. This result is achieved in part by the position of sealing ring 33 near the inner end of tube 28 or such that when said tube is angularly deflected, for example, with some endwise displacement, an inner end portion thereof rides or fulcrums on said ring thereby maintaining full effective sealing at that zone; and an edge portion of flange 29 rides on the truncated conical surface 32 of bushing R. Although a separate piece, bushing R functions in cooperation with sleeve 19, for some purposes, as an inward extension of said sleeve which, being removable, facilitates assembly and dismounting of the coupling.

I claim:

1. A pipe coupling comprising a hollow casing having an open end and internal stop means, a tube extending through said open end and having an end portion positioned in the casing, a sleeve removably positioned in the casing and encircling said tube, a removable locking element operatively interposed between the interior wall of said casing and the exterior wall of said sleeve, a bushing positioned within said casing between the sleeve and said stop and encircling said tube whereby the extent of axial movement of the bushing into said casing is limited by said stop the outer diameter of the bushing being substantially equal to the internal diameter of the casing adjacent thereto, the inner end of said tube being flared into a terminal flange having an outer diameter greater than the inner diameter of the bushing, said flange being operatively engaged with inwardly exposed face portions of said bushing, and sealing ring means surrounding portions of said inner end of the tube and including an inner sealing ring in operative engagement with and disposed between said bushing and said sleeve and operatively engaging an exterior surface portion of the tube, and an outer sealing ring operatively interposed between said sleeve and interior surface portions of the casing the inner diameters of the sleeve and the bushing being greater than the outer diameter of the tube to allow for angular displacement of the tube with respect to the sleeve and bushing.

2. A pipe coupling according to claim 7 and wherein said bushing has a coaxial frusto conical inwardly directed face arranged and adapted to be operatively engaged by coaxial outwardly directed surface portions of said flared end of the tube.

3. A pipe coupling according to claim 1 and wherein said sleeve defines at its inner end a substantially cylindrical cavity and an inwardly facing annular shoulder, and said bushing is provided with a substantially cylindrical outwardly extending flange in telescoping engagement with said sleeve cavity and in operative engagement with said inner sealing ring to releasably retain the same between said flange and said inwardly facing annular shoulder of the sleeve.

References Cited

UNITED STATES PATENTS

| | | | |
|---|---|---|---|
| 2,364,447 | 12/1944 | Hynes | 285—234 |
| 2,463,336 | 3/1949 | Weatherhead | 285—234 |
| 2,760,258 | 8/1956 | Rieger | 285—321 X |
| 2,916,305 | 12/1959 | Sherman | 285—321 X |
| 3,127,199 | 3/1964 | Roe | 285—165 |

FOREIGN PATENTS 878,602  10/1961  Great Britain.

CARL W. TOMLIN, *Primary Examiner.*

THOMAS F. CALLAGHAN, *Assistant Examiner.*